United States Patent [19]
Ito

[11] 3,920,102
[45] Nov. 18, 1975

[54] DISC BRAKE ACTUATING AND ADJUSTING MECHANISM
[75] Inventor: Hiroshi Ito, Yokohama, Japan
[73] Assignee: Tokico, Ltd., Kanagawa, Japan
[22] Filed: Jan. 10, 1974
[21] Appl. No.: 432,163

[30] Foreign Application Priority Data
Jan. 19, 1973 Japan.............................. 48-8389
Mar. 16, 1973 Japan.............................. 48-32355

[52] U.S. Cl.......... 188/71.9; 188/72.8; 188/196 BA
[51] Int. Cl.².................. F16D 55/224; F16D 65/56
[58] Field of Search ....... 188/71.8, 71.9, 72.6, 72.7, 188/72.8, 72.9, 79.5 K, 196 BA

[56] References Cited
UNITED STATES PATENTS

| | | | |
|---|---|---|---|
| 2,820,530 | 1/1958 | Chouings et al................... | 188/71.9 |
| 3,243,016 | 3/1966 | Swift............................. | 188/196 BA |
| 3,638,763 | 2/1972 | Laverdant........................ | 188/71.9 |
| 3,765,513 | 10/1973 | Brooks............................ | 188/71.9 |
| 3,789,959 | 2/1974 | Kawaguchi........................ | 188/71.9 |

FOREIGN PATENTS OR APPLICATIONS
1,087,988  10/1967  United Kingdom................ 188/71.9

*Primary Examiner*—Duane A. Reger
*Assistant Examiner*—Edward R. Kazenske
*Attorney, Agent, or Firm*—James E. Nilles

[57] ABSTRACT

A disc brake comprising an input shaft adapted to receive an input force as a torque around the longitudinal axis thereof and to move rotationally and axially by converting a portion of the torque into an axial thrust, a bolt having one end axially slidably engaging the input shaft and the other end abutting a friction pad, a nut having screw-threads engaging said bolt and being adapted to receive the thrust from the input shaft and when clamping force exceeds a predetermined value to rotate with the input shaft, a ratchet mechanism being disposed between the input shaft and the nut so as to rotate the nut with the input shaft thus moving the bolt toward the friction pad when adjustment is required.

2 Claims, 6 Drawing Figures

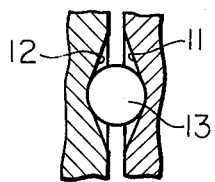
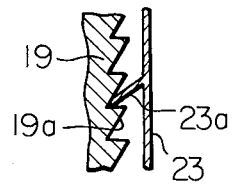
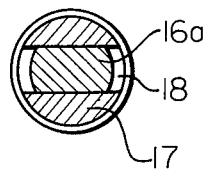
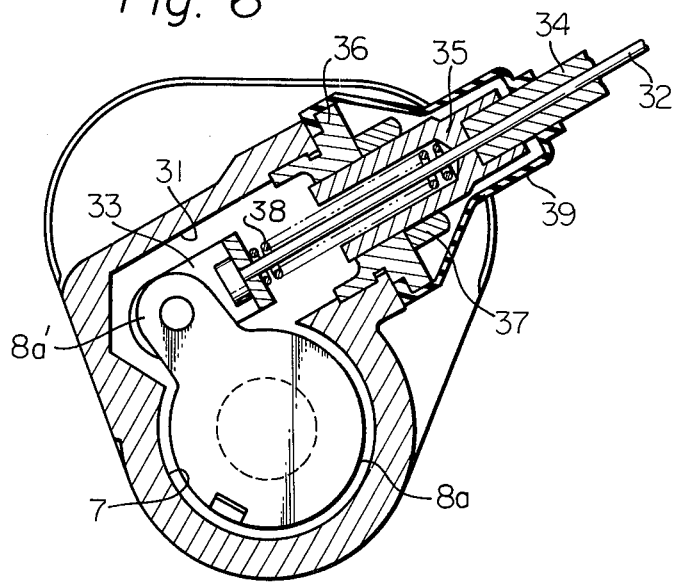

DISC BRAKE ACTUATING AND ADJUSTING MECHANISM

BRIEF SUMMARY OF THE INVENTION

This invention relates to a disc brake, and more particularly to a mechanical type disc brake having an automatic clearance adjusting device presenting an excellent performance.

Difficulties are encountered with the incorporation of an automatic clearance adjusting device in the disc brake due to a special construction thereof. Hitherto, the automatic clearance adjusting device in the disc brake is subjected to influence of deformation of a calliper or an operating lever, when braking force is applied, thus resulting in the failure of achieving a stable adjusting function. In addition, it is costly because a great number of parts have to be incorporated in the device.

Furthermore, the application and release of the brake are effected by converting rotational movement into axial movement. With the conventional brake device, the aforesaid rotational movement is effected by a rotational operating member disposed outside of the housing of the brake, and as a result, this dictates the use of a large operational space, thus presenting disadvantages.

It is accordingly an object of the invntion to provide a disc brake which obviates the aforesaid shortcomings, in a mechanically operable disc brake.

According to the present invention, there is provided a disc brake comprising an input shaft adapted to receive an input force as a torque around the longitudinal axis thereof and to move rotationally and axially by converting a portion of the torque into an axial thrust, a bolt one end of which engages the input shaft and the other end of which abuts with a friction pad, a nut screw-thread engaging with said bolt and being adapted to receive said thrust from the input shaft and when clamping force exceeds a predetermined value to rotate with said input shaft, a ratchet mechanism being disposed between said input shaft and the nut for rotating the nut with the input shaft when the input reverses its rotation when brake is released.

These and other objects and features of the invention will be clear from a reading of the ensuing specification in conjunction with the accompanying drawings which indicate several embodiments, in which:

BRIEF DESCRIPTIONS OF DRAWING

FIG. 2 is a cross-sectional view taken along the line II—II of FIG. 1 and FIG. 5;

FIG. 3 is a cross-sectional view taken along the line III—III of FIG. 1 and FIG. 5:

FIG. 4 is a cross-sectional view taken along the line IV—IV of FIG. 1 and FIG. 5;

FIG. 6 is a cross-sectional view taken along the line I—I of FIG. 5.

DETAILED DESCRIPTION OF INVENTION

Figure 1:
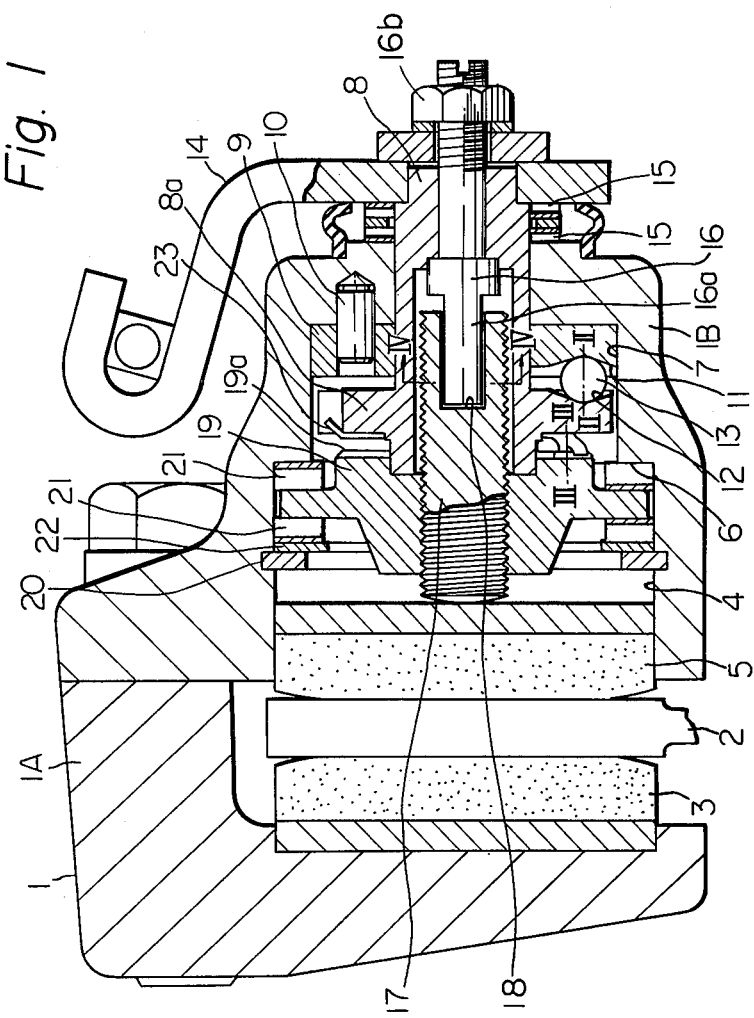
FIG. 1 is a longitudinal cross-sectional view of an embodiment of the disc brake according to the present invention.

Referring now to FIGS. 1 to 4, there is shown at 1 a calliper housing consisting of members 1A and 1B secured together, movable either to the left or to the right and mounted on car body in a straddling relation over a rotating disc 2. Attached to the member 1A on one side of the disc 2 is a friction pad 3, while a friction pad 5 is slidably fitted in a hole 4 defined by the member 1B on the other side of the disc 2. A hole 7 of a smaller diameter than that of the hole 4 is provided coaxially with the hole 4, while a shoulder portion 6 is formed at the step between the holes 4 and 7.

Shown at 8 is an input shaft which is journaled in the member 1B in a manner that it may move in an axial direction and rotate about its axis, and the input shaft 8 is formed with a flange portion 8a which is located in the aforesaid hole 7.

Designated at 9 is a ramp plate which is disposed in the hole 7 and rigidly fixed to the member 1B by means of a pin 10, with the aforesaid input shaft 8 extending through the ramp plate 9 in movable relation thereto.

At the portion opposing to each other, of the ramp plate 9 and flange portion 8a of the input shaft 8, there are provided grooves 11 and 12 having inclined surfaces or ramps, and a ball 13 is placed in the space defined thereby. A combination of opposing grooves 11 and 12, and balls 13 are provided at positions dividing the entire circumference of the ramp plate 9 and flange portion 8a into a suitable number of divisions.

Secured on the externally projecting portion of the input shaft 8 is an operating lever 14. Interposed between the operating lever 14 and the member 1B are two wave washers 15, with a flat washer being interposed between said wave washers. The input shaft 8 is urged to the right in the drawing under a spring force of the wave washers 15 and thus the ramp plate 9 abuts with the aforesaid balls 13.

Provided in the input shaft 8 is a stepped through hole, and a stopper 16 is disposed therethrough. The stopper 16 is rigidly affixed by nut 16b to the small diameter portion of the input shaft 8, while the portion of said stopper 16 which extends inwardly is formed with a barrel-shaped portion 16a having flat upper and lower surfaces as seen in FIG. 1 and as clearly shown in FIG. 4.

Designated at 17 is a bolt, one end of which is formed with a groove 18 therein, in which is received the barrel-shaped portion 16a of the stopper 16, as shown in FIG. 4. It follows that the bolt 17 may move in an axial direction relative to the stopper 16 but is prevented from rotation. The other end of the bolt 17 abuts with the rear surface of the friction pad 5.

Shown at 19 is a nut which is threadedly engaged by the aforesaid bolt 17, and the outer circumferencial edge of the nut 19 is held between a stop ring 20 and the shoulder portion 6 by way of two wave washers 21. The two wave washers 21 abut opposite sides of the outer circumferential edge of the nut 19 and maintain a sufficient force thereagainst to prevent rotation of the nut 19 until a sufficient torque is applied to the nut 19 to overcome the frictional resistance therebetween. Shown at 22 is a spacer which locates the nut 19 with respect to the axial direction, and the nut 19 is maintained in position in abutment on the input shaft 8.

There is provided a ratchet mechanism disposed between the nut 19 and the input shaft 8 and adapted to transmit to a nut the uni-directional rotation of the input shaft 8. In other words, this ratchet mechanism consists of a ratchet spring 23 having a pawl 23a affixed to a flange portion 8a of the input shaft 8 and, a ratchet teeth 19a formed on the adjacent side of the nut 19. In this respect, the direction of rotation of the ratchet mechanism is such that the rotation of the input shaft 8 during the return stroke after applying braking action causes the nut 19 to rotate. It is needless to mention that such a braking action will not be effected unless the relative displacement between them exceeds a distance corresponding to at least one tooth.

In operation, when the operating lever 14 is rotated for applying braking action to a vehicle, the input shaft 8 integral with the aforesaid lever 14 and a stopper 16 will be caused to advance against the spring action of the wave washers 15 and 21 by means of mechanism consisting of grooves 11 and 12 defined in the flange portion 8 and ramp plate 9, and the balls 13. This causes the nut 19 to advance axially against the resistance of the wave washers 21. In this respect, in the initial stage of the operation, the rotational frictional resistance between the nut 19 and the input shaft 8 is small, such that rotational movement will not be transmitted from shaft 8 to nut 19. It follows then that, during this phase of operation, there is caused a relative movement about the axis between the input shaft 8 and the nut 19, with the result that the pawl 23a of the ratchet mechanism will rotationally advance in such a direction that the pawl 23a rides over a tooth 19a. The axial advance of the nut 19 will cause the axial advance of the bolt 17, such that the friction pad 5 will be urged against the disc 2. The reaction force caused thereby in turn causes the calliper housing 1 to move to the right in the drawing, and as a result, the friction pad 3 will be urged against the disc 2 such that the disc 2 will undergo a clamping force. This is best illustrated in FIG. 1.

The reaction force caused by the braking force, i.e., the clamping force will give rise to a greater rotational frictional force between the input shaft 8 and the nut 19. When the rotational frictional force exceeds a given value such that the frictional force between the wave washers 21 and the outer circumferential edge of the nut 19 is exceeded by the frictional force generated between the shaft 8 and the nut 19, the nut 19 will rotate integrally with the input shaft 8.

When the operating lever 14 is released, the operating lever 14, input shaft 8, stopper 16, nut 19 and bolt 17 will return to their home positions by means of the spring forces of wave washers 15 and 21, i.e., in a direction reverse to that during the braking operation.

In case the amount of wear in friction pads 3 and 5 is substantially great, the pawl 23a of the ratchet mechanism will advance, on its braking stroke, a distance corresponding to ride over one or more teeth of the teeth 19a, while the pawl 23a will transmit the rotation of the input shaft 8 to the nut 19 on its return travel. The initial relative rotation of the input shaft 8 and the bolt 17 with respect to 17 to project an additional amount from the nut 19 at the completion of the braking cycle, whereby the travel required on the next braking stroke has been automatically adjusted to a given range. In summary, the automatic adjustment means of the present invention operates in the following manner. When arm 14 is rotated, the shaft 8 rigidly attached thereto is also caused to rotate. During the rotation of the shaft 8, the balls 13 and the cams 11 and 12 also cause the shaft 8 to move axially. Since the shaft 8 is rigidly secured to the stopper 16, the stopper 16 causes the bolt 17 to rotate with shaft 8. Nut 19 is in abutment to shaft 8 such that axial movement of the shaft 8 causes nut 19 to move axially therewith. However, the frictional resistance of wave washer 21 on the outer circumferential edge of the nut 19 prevents initial rotation of nut 19 with the shaft 8. Thus, bolt 17 rotates within nut 19 at the same time that it is caused to move axially by the nut 19. If the pads 3 and 5 have worn so much as to allow a substantial axial movement of the shaft 8, the shaft 8 will also be allowed to rotate such that the pawls 23a will advance to another ratchet tooth 19a. When the braking action is released and shaft 8 rotates in the opposite direction the pawls 23a will overcome the frictional resistance of wave washers 21 against the outer circumfernetial portion of nut 19 and cause nut 19 to rotate with the shaft 8 and the bolt 17. At the end of this cycle, however, it will be appreciated that the bolt 17 has rotated somewhat with respect to the nut 19 and therefore protrudes farther through it, thus compensating for wear of the friction pads 3 and 5.

Naturally, it is possible to arrange in such a manner that the bolt 17 may advance so as to effect adjusting action or braking stroke by reversing the directions of the pawl 23a and the ratchet teeth 19a.

The mechanical disc brake according to the present invention is arranged in the aforesaid manner. Accordingly, when the brake is applied, the input shaft 8 and the nut 19 will rotate integrally, such that the automatic adjusting action may not be affected even if there is caused a deformation in the caliper housing 1 or even if there is caused a change in the operating force of the operating lever 14. This brings about a stable automatic adjusting action.

In addition, the arrangement in which the operating lever 14 and the input shaft 8 integral therewith advance together results in reduction in the number of parts to be incorporated, and yet presents long lasting durability and improved economy, as compared with the conventional disc brakes.

Figure 5:
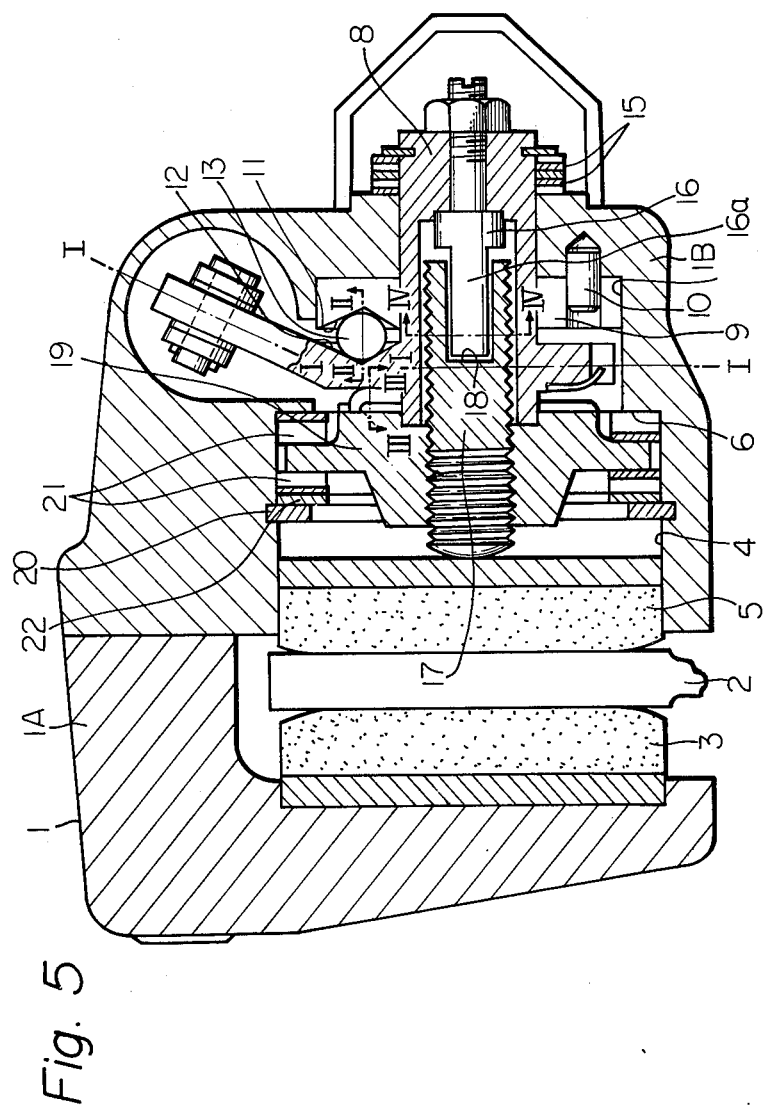
FIG. 5 is a longitudinal cross-sectional view of the second embodiment of the present invention.

FIGS. 5 and 6 show modifications of the embodiment in FIGS. 1 to 4, in which similar parts are designated by the same reference numerals.

Referring to FIGS. 5 and 6, shown at 31 is a second hole defined in the body 1 in a direction perpendicular to those of the holes 4 and 7.

Represented by the reference numeral 8 is an input shaft, while a flange portion 8a thereof is formed integrally with a projecting portion 8a' extending into the hole 31 of the aforesaid second hole 31.

Shown at 32 is a cable which is secured by way of a coupling member 33 to the projecting portion 8a' for the purpose of transmitting the operational force from outside of the body through the second hole 31 to the input shaft 8. This cable 32 is guided by an outer cable 34, supporting member 35, a cover 36 and a nut 37. Shown at 38 is a return spring mounted between the coupling member 33 and a supporting member 35, and at 39 a boot which is adapted to prevent dust from its entering the second hole 31.

Duplicate description is avoided as to this embodiment, because the other portions thereof than those described are the same in construction and in operation as those shown in FIGS. 1 to 4.

The disc brake of the invention is completely housed in the body thereof, with the operating cable only remaining projected, whereby it may not be damaged due to stone or the like hitting same. In addition, the construction of the disc brake of the invention is compact in construction.

What is claimed is:

1. A disc brake comprising a housing having an axially stepped bore for receiving an input shaft, a bolt and a nut, said input shaft receiving an input force as a torque around the longitudinal axis thereof and moving rotatinally and axially by means disposed between said housing said input shaft for converting a portion of the torque into an axial thrust, said bolt having one end axially slidably engaged with the input shaft and the other end abutting a friction pad, said nut having screw-threads engaging said bolt and receiving said axial thrust from the input shaft and when a clamping force between the input shaft and the nut exceeds a predetermined value, rotating with said input shaft, and a ratchet mechanism being disposed between said input shaft and the nut for unidirectionally rotating the nut with the input shaft, characterized in that said bolt and said input shaft are connected by a member, one end of which has parallel opposing axially extending surfaces for slidably engaging an axial slot formed in said bolt, and the other end extending axially through a bore formed in said input shaft and being releasably secured thereto by means of a nut engaging said member.

2. A disc brake as set forth in claim 1 wherein a spring is disposed in said housing for normally biasing said nut against the input shaft and for restraining said nut against rotation until the clamping force exerted by said input shaft exceeds a pre-determined value wherein said nut rotates with the input shaft.

* * * * *